United States Patent [19]

Hopp

[11] E Re. 30,993

[45] Reissued Jul. 13, 1982

[54] GENERAL PURPOSE COMPRESSION-TYPE SPRAYER

[75] Inventor: Leo A. Hopp, Canoga Park, Calif.

[73] Assignee: Column Corporation, Van Nuys, Calif.

[21] Appl. No.: 248,722

[22] Filed: Mar. 30, 1981

Related U.S. Patent Documents

Reissue of:

[64] Patent No.: 4,204,645
Issued: May 27, 1980
Appl. No.: 906,467
Filed: May 17, 1978

[51] Int. Cl.[3] ..... B05B 7/30

[52] U.S. Cl. ..... 239/341; 222/631; 239/346; 239/354; 239/361; 239/416; 239/417

[58] Field of Search ..... 239/341, 346, 354, 355, 239/357, 360, 361, 364–369, 371, 373, 408, 413, 416, 416.4, 416.5, 417, 423, 426, 431, 434; 251/206, 207; 222/310, 635, 631–633

[56] References Cited

U.S. PATENT DOCUMENTS

| | | | |
|---|---|---|---|
| 1,670,235 | 5/1928 | Buchanan | 239/355 X |
| 1,723,715 | 8/1929 | Waters, Jr. | 239/341 X |
| 2,833,594 | 5/1958 | Palm | 239/346 X |
| 2,923,481 | 2/1960 | Pinke | 239/354 |
| 3,024,806 | 3/1962 | Colonna | 251/206 X |
| 3,820,722 | 6/1974 | Jett et al. | 239/373 |

*Primary Examiner*—Andres Kashnikow
*Attorney, Agent, or Firm*—Robert Louis Finkel

[57] ABSTRACT

A compression-type spray device employing a single nozzle can be used to spray materials varying widely in density, composition and particle size. The device incorporates an air-and-material mix control using variably exposed slots in the nozzle to regulate the flow of high-pressure air through the nozzle[, and a]. *A* material supply control [using] *having* variable restrictions *may be provided* in the material supply tube inlet to regulate the flow of material to the nozzle.

10 Claims, 2 Drawing Figures

GENERAL PURPOSE COMPRESSION-TYPE SPRAYER

Matter enclosed in heavy brackets [ ] appears in the original patent but forms no part of this reissue specification; matter printed in italics indicates the additions made by reissue.

BACKGROUND OF THE INVENTION

1. Field of the Invention

The subject invention relates to compression-type spray devices having means for regulating both the composition and the force of the spray. More particularly it is concerned with regulated compression-type devices capable of use with materials having a wide range of density, composition and particle size.

2. Prior Art

It has long been recognized that by varying the proportions of air and fluid or particulate material in a compressed air-produced [spary] *spray* stream it is possible to control the composition and force of the resulting spray and to permit the spraying of materials having a variety of flow characteristics.

However, most such prior art sprayers, and particularly those of the inexpensive, hand-operated type, have required a change of [nozzel] *nozzle* to accommodate materials of greatly different flow characteristics. Generally, each nozzle has been capable of handling a limited change of materials.

Sprayers having adjustable nozzles have also been characterized by objectionable "touchiness" or oversensitivity of the spray dynamics to the mixture control, at least in some part of its range of adjustment. Prior art attempts to overcome these problems have introduced nozzles with complex machined or cast shapes, or utilizing deformable rubber or plastic sealing parts, to provide acceptable dynamic range and reasonably consistent response sensitivity over the range of adjustment.

In one representative example, the variable spray device of L. W. P. Buchanan, described in U.S. Pat. No. 1,670,235 (May 15, 1928), features nozzle adjustability for controlling the texture of the spray, but also provides a choice of replaceable nozzles (40 and 40a of Buchanan's drawings). It should be noted that adjustment of Buchanan's nozzle controls only the injection of air into the final nozzle orifice, although the material supply is controlled to some extent by the application of pressurized air at the end of the supply tube.

In another example, the nozzle assembly for sprayers, patented Feb. 2, 1960 by A. H. Pinke (U.S. Pat. No. 2,923,481), provides a camming action to close and open the nozzle as a whole. In other words, the adjustment of the nozzle controls the material supply and pressurized air in common. Again, the relative proportions of the two are controlled to some extent by the application of pressurized air at the end of the supply tube, which is perhaps more effective when the nozzle is closed. (Pinke also provides an O-ring closure to seal off the nozzle entirely, rather than relying on metal-to-metal closure as with Buchanan.)

In an attempt to control more directly the proportions of air and material supply. Howard V. Jett and Joseph V. DeMarco patented June 28, 1974 an aggregate spray gun (U.S. Pat. No. 3,820,722), whose nozzle adjustment acts only on the pressurized air supply to the mix. Thus as with Buchanan the proportions of air and material supply are adjusted by manipulating the nozzle. In addition Jett and DeMarco apparently attempt to overcome the problems of consistent sensitivity over the range of the nozzle adjustment by providing an adjustment mechanism in which manipulation of the nozzle compresses on O-ring against a fluted internal surface consisting of an internal cone followed by an internal cylindrical surface. The deformation of the O-ring into the compound channels produced by the fluting of the internal cone and cylinder presumably offers a degree of control superior to that of Pinke or Buchanan.

None of these devices is addressed to the desirability of or succeeds in, providing for the use of the sprayer with a wide range of materials. Neither is any of them capable of smooth, consistent sensitivity to adjustment over the entire region of adjustability of the nozzle.

It is the principal object of the subject invention to provide a simple, inexpensively constructed, easily maintained adjustable spray device which overcomes these deficiencies.

SUMMARY OF THE INVENTION

The subject invention includes a supply tank containing the material to be sprayed, such as a slurry or aggregate of particulate or fiberous [accoustic] *acoustic* composition, a [nozzel] *nozzle* having a spray-producing orifice, a supply tube having one end connected to the nozzle and the other end immersed in the fluid material, and a source of air under pressure connected to the supply tank to force the fluid material through the supply tube to the nozzle.

The invention provides separate, independent means for controlling the flow of material delivered to the nozzle, and for regulating the amount of pressurized air mixed with the material within the nozzle.

Regulation of the air flow is accomplished by variable exposure of a simple slotted cylinder, an arrangement which by suitable choice of dimensions offers smooth, relatively uniform sensitivity to adjustment over the entire adjustment range.

By comparison with most of the devices of the prior art, the present invention uses very simple machined or molded parts, the shapes of which are nearly all planar, cylindrical or threaded. The result is an inexpensive, relatively maintenance-free truly general purpose hand sprayer having an extraordinarily wide range of use. Previously known hand sprayers would require several different nozzles to approach the capability of the present invention, which includes the spraying of such widely disparate materials as liquids ranging from thin lacquers to thick-textured and enamel paints; ceramic clay slips, engobes and glazes; acoustic aggregates for wall and ceiling coverings; dry powders for insect and pest control; seed for planting and propagation; and floc spray for decoration and artwork.

As will be seen, the invention is adaptable to spray devices ranging from large high-volume commercial spray units employing compressed air supplied by powered compressors to small self-contained sprayers utilizing air carried in pressure vessels. For illustrative purposes the preferred embodiment selected for description here is a hand-held sprayer similar in general appearance, construction and operation to the well known manually operated garden sprayer.

The various advantages of the present invention will be more readily understood and appreciated by reference to the following discussion and the accompanying figures, of which:

THE DRAWINGS

FIG. 1 is a side view, mostly in section but partly in elevation, of a preferred spray apparatus in accordance with the present invention; and FIG. 2 is a sectional view taken along the line 2—2 in FIG. 1, looking in the direction of the arrows toward the nozzle orifice.

DETAILED DESCRIPTION

Figures 1, 2:
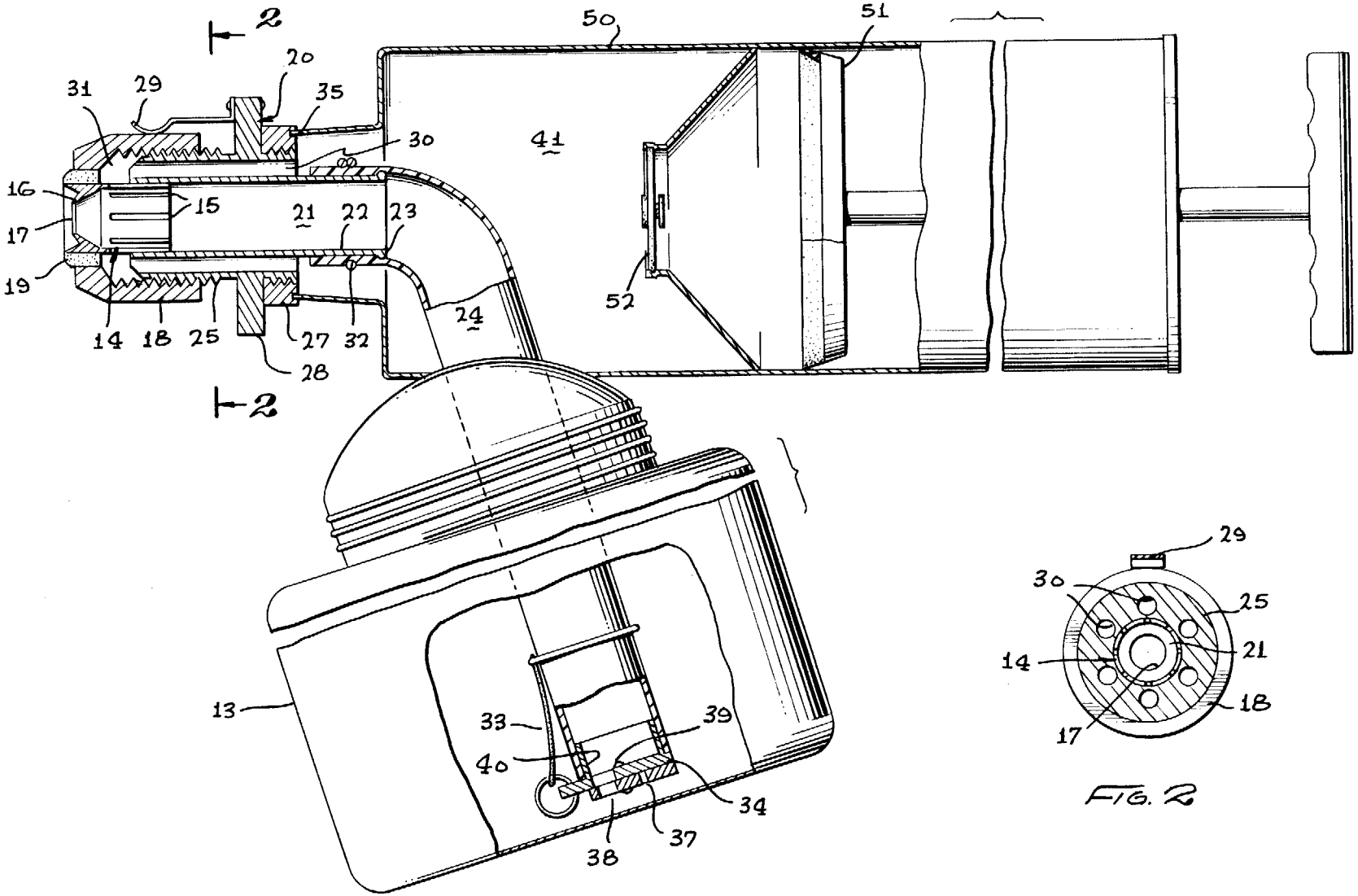

Referring to FIGS. 1 and 2, a mixer and ejector 14, composed of an open tube with slots 15 cut in one end and tapering at the other end 16 to an ejector orifice 17, is attached to the inside of adjusting nut 18 as with resilient adhesive compound 19, or by other convenient means. Adjusting nut 18 has internal threads to mate with external threads 25 of the adapter or transfer body 20. Adjusting nut 18 has hexagonal sides for ease of rotational positioning and also to engage an indexing spring 29 attached to the transfer body 20, to retain the nut 18 in its selected position.

The transfer body 20 is threaded into boss 27, which in turn is attached at 35 by welding, brazing or other suitable means to the body 50 of a compressor.

The transfer body 20 defines a central passage 21 whose internal diameter 22 is sized for a sliding clearance fit to the outside diameter of the slotted end of the mixer and ejector 14. The inner end of the transfer body—that is, the end facing toward the compressor—is extended to provide a nipple 23 for attachment of material supply tube 24.

Though the transfer body 20 mates and seals directly with the slotted end of mixer and ejector 14, the mixer and ejector piece 14 is supported and adjusted by means of the adjusting nut 18.

The transfer body 20 has a protruding flange 28 acting as a thread stop in assembling the transfer body to the boss 27, and also to permit grasping of the transfer body to install and remove it by rotation relative to the boss 27.

The transfer body has air passages 30 located about the central passage 21, permitting air pressure from chamber 41 to be applied to plenum chamber 31 for distribution to the exposed portion of the mixer and ejector slots 15.

The supply tube 24 is provided to carry material to be sprayed from the supply tank 13 to the transfer body. The supply tube 24 has a variable restrictor 34 permanently attached to it by a plastic cord 33, and inserted into the end of the supply tube 24. While the variable restrictor in combination with the adjustable nozzle serves to eliminate the need for a plurality of adjustable nozzles, the variable restrictor need not be manufactured to high precision or constructed to any particularly demanding requirements. In the embodiment shown, it comprises a rotatable plate defining a plurality of orifices as at 37 and 38, rotatable about pin 39 into alignment with the main entrance opening 40. For best results the rotatable plate may be provided with a conventional detent (not shown) to hold it in the position selected by a user. For another level of "adjustment" the entire variable restrictor 34 may be withdrawn from the end of the tube 24.

The supply tube 24 is preferably made of a length of semiflexible plastic tubing formed to fit over nipple 23 and curved to reach into the supply tank 13. By use of spring clamp 32 to retain tube 24 over nipple 23 while permitting relative rotation of tube 24 and nipple 23, the design permits the nozzle to be unscrewed from the compressor and withdrawn complete with supply tube 24 and restrictor 34 attached. This simplifies and facilitates disassembly of the sprayer for cleaning.

A typical garden-type hand-operated compressor, comprising cylindrical outer body 50, piston 51, one-way valve 52, and material supply tank 13, provides both air under pressure and material to be sprayed.

Air discharged through valve 52 by operation of piston 51 increases the pressure in the chamber 41 above the material in supply tank 13, forcing the material up the supply tube 24, through the central passage 21 and through and out the mixer and ejector 14. Compressed air from the chamber 41 is also delivered through air passages 30 to the plenum chamber 31, and distributed through the exposed portions of the slots 15 of the mixer and ejector 14, thus diffusing the material being sprayed.

The ratio of air to material being diffused and impelled from the mixer and ejector orifice 17 is controlled by the length of the exposed slots 15 and by the orifice size of the variable restrictor 34, when it is installed, or of the open end of the tube 24 when the restrictor 34 is not installed.

The ratio of air to material depends in a general way on the ratio of exposed length of slots in the mixer and ejector to area of opening 40 selected at the restrictor 34. In effect the restrictor provides stepwise changes in these ratios, while the adjustable slotted-tube mixer and ejector piece 14 provides intermediate continuous adjustment; however, it is possible to conceive of stepwise adjustment at the mixer and ejector, in combination with continuous adjustment of restrictor opening, or both stepwise, or both continuous.

In any event, in any preferred embodiment variable restrictor 34 has multiple openings 40 of different size, with the user making a selection dependent upon the specific gravity and viscosity of the material to be sprayed, and the spray pattern desired. The smallest openings generally are selected for the lightest and thinnest of the liquids to be sprayed, and the restrictor is generally removed from the tube end when solids or aggregate are to be sprayed.

Turning the adjusting nut 18 increases or decreases the length of the slots 15 exposed to the air pressure in the plenum chamber 31, changing the ratio of air to material and consequently the resultant spray pattern—and in the case of liquids the resultant particle size, from a mist to a heavy splatter or even a solid stream as desired.

Adjusting nut 18 has coarse threads and a loose thread tolerance, relative to the mating threads 25 of the transfer body 20. This helps prevent thread jamming by foreign material and provides easy finger-grip control. The bore 22 of the mixer and ejector must be in a close sliding fit with the transfer body, to prevent erratic operation resulting from uncontrolled air leakage from the plenum chamber 31 into the central passage 21. To accommodate the inherent tolerance mismatch resulting from the loose fit of the adjusting nut 18 to the transfer body and the close fit of the mixer and ejector to the transfer body, the adjusting nut and mixer and ejector piece 14 are preferably attached to each other by resilient adhesive compount 19.

It will be appreciated that the embodiment described here was selected for illustrative purposes, and that any number of equally representative alternative examples could have been chosen without departing from the spirit and scope of the invention as claimed.

I claim:

1. Apparatus for spraying material delivered to a nozzle assembly from a supply tank through a supply passage under impulsion of compressed gas from a source thereof applied to the surface of said material in said tank wherein compressed gas from said source is also mixed with said material, comprising:

a cylinder having at least one aperture therethrough interposed between said gas source and said supply passage just upstream of the final aperture of said nozzle assembly, said cylinder having its outer surface in communication with said gas source and its inner surface in communication with said supply passage and being slidable axially in contact with the end of said supply passage; *and* positioning means including an adjustment nut connected to said cylinder and to said supply passage, at least one of said connections being by means of threads, associated with said nozzle assembly for moving said cylinder axially of the end of said supply passage and thereby controlling the portion of the aperture in the cylinder which is available for gas flow therethrough and thus variably restricting the flow of compressed gas into said material [and].

[adjustable means interposed between said supply tank and the inlet end of the supply passage for variably restricting the flow of material into said passage.]

2. The apparatus of claim 1 wherein the aperture in said cylinder is a slot therethrough disposed axially at one end thereof.

3. The apparatus of claim 1 wherein said cylinder contains a plurality of slots disposed axially at one end thereof.

4. The apparatus of claim 1 wherein said adjustment nut is threaded to said cylinder and said supply passage, and said cylinder contains a plurality of slots disposed axially at one end thereof.

5. Apparatus for spraying material from a supply tank under impulsion of compressed gas from a source thereof applied to the surface of said material in said tank, comprising:

an elongated supply tube having one end disposed in said supply tank for immersion in said material;

a transfer body secured to the other end of said supply tube and having a passage therethrough, one end of said passage being in communication with said supply tube, and at least one bore therethrough, one end of said bore being in communication with said gas source;

a nipple mounted at one of its ends to said transfer body for axial motion in substantially gas-tight contact therewith, said nipple being in communication with the other end of the bore in said transfer body;

a cylinder disposed in said nipple having at least one aperture at one of its ends and being sized for sliding axial motion within the passage in said transfer body in substantially gas-tight contact therewith, and having a tapered portion at its other end terminating in an opening and sealed to the inner wall of said nipple whereby said opening defines an orifice at the other end of said nipple; *and* positioning means associated with said nipple for controllably moving said nipple axially of said transfer body, thereby varying the portion of said aperture which is available for gas flow therethrough [and].

[adjustable means in said supply tube for variably restricting the flow of said material from said supply tank into said supply tube.]

6. The apparatus of claim 5 wherein said positioning means includes threads connecting said nipple and said transfer body.

7. The apparatus of claim 6 wherein said aperture is a slot disposed axially at the end of said cylinder.

8. The apparatus of claim 7 wherein said cylinder contains a plurality if slots disposed axially at the end thereof.

*9. The apparatus of claim 1 wherein adjustable means are interposed between said supply tank and the inlet end of the supply passage for variably restricting the flow of material into said passage.*

*10. The apparatus of claim 5 wherein adjustable means are interposed between said supply tank and the inlet end of the supply passage for variably restricting the flow of material into said supply tube.*

* * * * *